(12) United States Patent
Matsuzawa

(10) Patent No.: US 6,326,328 B1
(45) Date of Patent: *Dec. 4, 2001

(54) SOLID ACID CATALYST AND PROCESS FOR PREPARING THE SAME

(75) Inventor: Kenji Matsuzawa, Urawa (JP)

(73) Assignee: Japan Energy Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/493,562

(22) Filed: Jan. 28, 2000

Related U.S. Application Data

(63) Continuation of application No. 09/065,081, filed as application No. PCT/JP97/03092 on Sep. 3, 1997.

(30) Foreign Application Priority Data

| Sep. 5, 1996 | (JP) | 8-254010 |
| Oct. 18, 1996 | (JP) | 8-295866 |
| Apr. 1, 1997 | (JP) | 9-82842 |

(51) Int. Cl.⁷ .......................... B01J 27/053; B01J 27/045
(52) U.S. Cl. .......................... 502/217; 502/222; 502/223; 502/325; 502/339; 502/349
(58) Field of Search ................... 502/216, 217, 502/222, 223, 325, 349, 339, 221

(56) References Cited

U.S. PATENT DOCUMENTS

| 4,918,041 | * | 4/1990 | Hollstein et al. . |
| 5,036,035 | * | 7/1991 | Baba et al. . |
| 5,214,017 | * | 5/1993 | Angstadt et al. . |
| 5,786,294 | * | 7/1998 | Sachtler et al. . |
| 5,837,641 | * | 11/1998 | Gosling et al. . |

* cited by examiner

Primary Examiner—Steven P. Griffin
Assistant Examiner—Christina Ildebrando
(74) Attorney, Agent, or Firm—Flynn, Thiel, Boutell & Tanis, P.C.

(57) ABSTRACT

The present invention relates to a shaped solid acid catalyst for the isomerization of hydrocarbons and so on, which has a high activity and is excellent in strength and easily handleable, and processes for the preparation thereof. This catalyst comprises a support comprising portions of zirconia having a tetragonal form and portions of alumina, and a sulfureous component and, if necessary, a Group 8, 9 or 10 metal component both being supported on the support, and has a specific surface area of 150 m²/g or above. The catalyst can be prepared by kneading aluminum hydroxide, zirconium hydroxide and a sulfureous compound, shaping the kneaded mixture, calcining the shaped material at such a temperature as to form tetragonal zirconia and, if necessary, supporting a Group 8, 9 or 10 metal component on the calcined material and calcining the resulting molding at 300 to 700° C.

16 Claims, 1 Drawing Sheet

US 6,326,328 B1

SOLID ACID CATALYST AND PROCESS FOR PREPARING THE SAME

This is a continuation of Ser. No. 09/065 081, filed Apr. 22, 1998 which is a 371 of PCT/JP97/03092 filed Sep. 3, 1997.

TECHNICAL FIELD

The present invention relates to a solid acid catalyst which exhibits a high activity in various acid-catalyzed reactions and is easily handleable and excellent in stability in service, and processes for the preparation of the same.

BACKGROUND ART

In the chemical industry there are many known reactions, such as alkylation, esterification and isomerization, etc., requiring an acid catalyst. Up to this time, such reactions have been conducted by the use of acid catalysts such as sulfuric acid, aluminum chloride, hydrogen fluoride, phosphoric acid and p-toluenesulfonic acid. However, these acid catalysts have the property of corroding metals, which make it indispensable to use an expensive corrosion-resistant material or to apply an anticorrosion treatment. Further, the acid catalysts have difficulty in separation from the reaction mixture and also had such a significant environmental problem that the use of the catalysts was indispensably accompanied with waste acid disposal, which involved alkali cleaning and other troublesome steps. Additionally, the catalysts were very difficult to re-use.

Solid acid catalysts containing a sulfate group have been proposed in order to solve the above problems, the catalysts being produced by bringing a hydroxide or hydrated oxide of a Group IV metal of the periodic table into contact with a solution containing a sulfureous component and calcining the hydroxide or hydrated oxide thus treated at 350 to 800° C.(Japanese Patent Publication No. 59-6181). These solid acid catalysts exhibit an acid strength higher than that of 100% sulfuric acid (Hammett acidity function $H_0$: −11.93). These catalysts have high catalytic performance for various acid-catalyzed reactions by virtue of the high acid strength, and are advantageous in that the corrosiveness is low, that they are easily separable from the reaction mixture and can dispense with waste acid disposal, and that they can be re-used. Accordingly, these solid acid catalyst are expected to substitute for the acid catalysts of the prior art in various reactions.

Further, it has already been known to the public that a catalyst produced by calcining zirconia gel containing a sulfureous component and incorporating platinum into the resulting zirconia exhibits high activity in the isomerization of hydrocarbons (U.S. Pat. No. 3,032,599).

Modifications of the above process for the preparation of the metal oxide catalyst mainly used for isomerization and containing a platinum-group metal and a sulfureous component are disclosed in Japanese Patent Publication Nos. 5-29503, 5-29504, 5-29505 and 5-20506. They include a modification comprising omitting the step of calcining between the step of treatment with a sulfureous compound and the step of deposition of a platinum-group metal, another modification comprising conducting the treatment with a sulfureous compound and the deposition of a platinum-group metal in reverse order, and still another modification comprising varying the sulfureous compound to be used.

Meanwhile, it is also known that a solid acid catalyst prepared by adding a sulfureous compound to aluminum hydroxide or aluminum oxide and calcining the obtained mixture exhibits an acid strength higher than that of 100% sulfuric acid (Japanese Patent Laid-Open No. 5-96171, and Arata, "Trends in Physical Chemistry", Vol.2, Section 1 (1991)).

Japanese Patent Publication No. 6-29199 discloses an isomerization catalyst prepared by incorporating both of at least one metal selected from among Ni, Ru, Rh, Pd and Pt and a sulfate group into a hydroxide or oxide of a Group IV metal selected from among Si, Ti, Zr and Sn and/or a hydroxide or oxide of aluminum. Further, a catalyst comprising a $Zr(OH)_4/Al(OH)_3$ powder produced by coprecipitation and both of platinum and sulfuric acid supported on the powder is disclosed in Example 6 of this patent.

DISCLOSURE OF INVENTION

Although the above solid acid catalysts are generally powdery ones, a shaped catalyst, for example, a granular one having a diameter of about 1 mm is necessary for industrial chemical reactions. However, there has not been reported any process by which a shaped solid acid catalyst satisfying the performance requirements for a catalyst can be prepared.

The present invention has been made to solve the above problems, and aims at providing a solid acid catalyst containing a sulfureous component which, in spite of its being shaped, exhibits a sufficiently high activity and has a crushing strength high enough for practical use, and processes for the preparation of the same.

The inventors of the present invention have found that a shaped catalyst having a high catalytic activity beyond expectations can be prepared by adding pseudoboehmite as a binder to zirconium hydroxide as a solid acid precursor, adding ammonium sulfate, shaping the mixture thus obtained, and calcining the shaped material and that another catalyst prepared by making chloroplatinic acid additionally supported on this shaped catalyst and calcining the resulting catalyst exhibits contrary to our expectations a hydrocarbon-isomerizing activity higher than that of a powdery zirconia catalyst containing platinum and a sulfureous component. Further, they have also found that catalysts prepared by incorporating these catalysts with boron oxide and/or phosphorus oxide exhibit excellent activity. The present invention has been accomplished on the basis of these findings.

Our further studies have revealed that pseudoboehmite alumina contributes to the stabilization of tetragonal zirconia. For example, when noncrystalline zirconium hydroxide or hydrated zirconia was calcined at 600° C., it crystallizes and most of the zirconia thus formed was monoclinic. However, when a compound prepared by kneading such a zirconium hydroxide or hydrated zirconia with powdery pseudoboehmite was calcined at 600° C., the zirconia crystals formed with the progress of crystallization were tetragonal and no monoclinic crystals were found. Thus, the addition of pseudoboehmite alumina is effective in stabilizing tetragonal zirconia. One of the causes of this effect is thought to be that pseudoboemite powder present among the crystalline particles of zirconia hinders the crystal growth of zirconia, though most of the causes have not been elucidated as yet.

Besides pseudoboemite alumina, many compounds are known to be effective in stabilizing tetragonal crystals of zirconia. However, many of the compounds are basic and therefore unsuitable from the standpoint of the requirements for the catalyst, particularly acidity. As described above, a solid acid catalyst prepared by adding a sulfureous compound to aluminum hydroxide or aluminum oxide and calcining the obtained mixture exhibits an acid strength higher than that of 100% sulfuric acid, and pseudoboehmite alumina exhibits extremely excellent shapability. Accordingly, it is essential in the present invention that the compound to be mixed with zirconia is alumina, with pseudoboehmite being optimum. The high activity of the catalyst according to the present invention is thought to result from the effects of pseudoboehmite.

Thus, the present invention relates to a process for the preparation of a solid acid catalyst, which comprises
  (a) kneading a hydroxide and/or hydrated oxide of aluminum, a hydroxide and/or hydrated oxide of zirconium, and a sulfureous compound,
  (b) shaping the kneaded mixture, and
  (c) calcining the shaped material at such a temperature as to give tetragonal zirconia,
or a process for the preparation of a solid acid catalyst, which comprises
  (a) kneading a hydroxide and/or hydrated oxide of aluminum, a hydroxide and/or hydrated oxide of zirconium, and a sulfureous compound,
  (b) shaping the kneaded mixture,
  (c) calcining the shaped material at such a temperature as to give tetragonal zirconia,
  (d) making a Group 8,9 or 10 metal component supported on the calcined material, and
  (e) calcining the resulting material at 300 to 700° C.

In particular, it is preferable to use aluminum oxide hydrate having a boehmite structure as the hydroxide and/or hydrated oxide of aluminum.

The solid acid catalyst of the present invention has the following characteristics:
  (a) it is a shaped catalyst comprising a support comprising both portions of tetragonal zirconia and/or hydrous zirconia and portions of alumina and/or hydrous alumina, and at least one element selected from among Group 8, 9 and 10 elements and a sulfureous component, both being supported on the support,
  (b) most of the zirconia crystals have a tetragonal form,
  (c) the specific surface area of the catalyst is 150 m$^2$/g or above, and
  (d) it is to be used for the isomerization of hydrocarbons.

BEST MODE FOR CARRYING OUT THE INVENTION

Hydroxide and/or Hydrated Oxide of Aluminum

Figure 1:
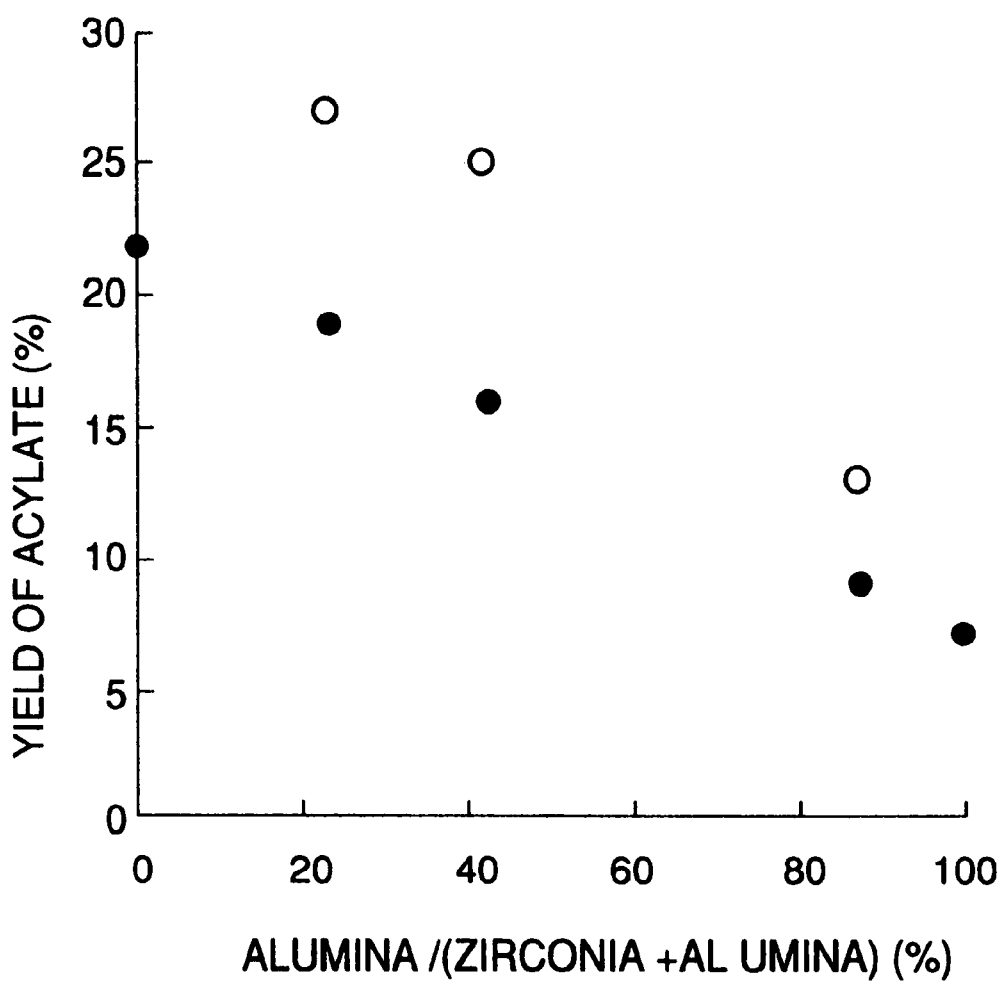
FIG. 1 is a plot showing the activities of catalysts A, B, C, J, K, L, M and N in the acylation of chlorobenzene with p-chlorobenzoyl chloride, with the yield (%) of acylate as the ordinate and the alumina content (%) of catalyst (based on the sum total of zirconia and the alumina) as the abscissa.

The hydroxide and hydrated oxide of aluminum to be used in the present invention may be any of those prepared by various processes. When α-or β-alumina, which is an oxide of aluminum, is used instead of the hydroxide and/or hydrated oxide of aluminum, the specific surface area and crushing strength of the catalyst will be low, and more monoclinic zirconia will be incorporated during the calcining subsequent to the shaped material to result in a catalyst poor in catalytic activity.

It is desirable that the hydroxide and/or hydrated oxide of aluminum be used in such an amount as to give a catalyst wherein the weight ratio of alumina to the sum total of alumina and zirconia is 5 to 90% by weight, more desirably 5 to 50% by weight, most desirably 20 to 50% by weight. When the weight ratio is below this range, the crushing strength of the catalyst will be poor and the zirconia will be unstable, while when the weight ratio is above this range, the catalytic activity will be relatively low.

It is generally desirable in order to enhance the crushing strength and specific surface area of the catalyst that the hydroxide or hydrated oxide of aluminum is a powdery one, more desirably, one having a mean particle size of 0.5 to 50 μm, most desirably, 0.5 to 20 μm. The use of aluminum oxide hydrate having a beohmite structure (for example, pseudoboehmite) as the hydroxide and/or hydrated oxide of aluminum is preferable, because it brings about an improvement in the catalytic activity.

Hydroxide and/or Hydrated Oxide of Zirconium

Although the hydroxide or hydrated oxide of zirconium to be used in the present invention may be prepared by any process, it can generally be prepared through neutralization or hydrolysis from salts or organometallic compounds of zirconium, for example, zirconium oxychloride, zirconim alcoholates, zirconium chloride, zirconium sulfate, zirconium nitrate and zirconium oxysulfate.

When the hydroxide or hydrated oxide of zirconium is amorphous, i.e., has no definite crystalline structure as determined by diffractometry with X rays or electron beams, the crushing strength of the catalyst is enhanced and the zirconia is effectively stabilized. It is generally desirable in order to enhance the crushing strength and specific surface area of the catalyst that the hydroxide or hydrated oxide of zirconium is a powdery one, more desirably one having a mean particle size of 0.5 to 50 μm, most desirably 0.5 to 20 μm.

Further, the hydroxide and/or hydrated oxide of zirconium may be a composite metal hydroxide and/or a hydrated composite metal oxide. Furthermore, the hydroxide and/or hydrated oxide and/or salts of zirconium may contain hydroxides and/or hydrated oxides and/or salts of other metals. Preferable examples of such metals include titanium, hafnium, vanadium, chromium, manganese, iron, silicon, tin, aluminum and gallium. Further, the compounds of these metals may be composite metal compounds thereof. However, it is preferable that the hydroxide or hydrated oxide of zirconium used in the present invention be one which contains zirconium substantially alone as the metal component.

Sulfureous Compound

The sulfureous compound according to the present invention includes sulfuric acid, ammonium sulfate, sulfurous acid, ammonium sulfite, thionyl chloride and so on, among which, ammonium sulfate and ammonium sulfite are preferable by virtue of their low corrosiveness against the production unit. The sulfureous compound may be used as such or in the form of a solution in water or the like.

It is desirable from the standpoint of catalytic activity that the amount of the sulfureous compound to be added in the preparation of the catalyst is 3 to 30% by weight, particularly 5 to 20% by weight based on the total amount of the hydroxide and/or hydrated oxide of aluminum, amorphous hydroxide and/or hydrated oxide of zirconium, and sulfureous compound before calcining.

The sulfureous compound may be used in a solid, liquid or dissolved state, and the solution thereof is not particularly limited in its concentration and may be selected in accordance with the quantity of liquid necessary for the subsequent kneading. It is preferable that the sulfureous compound be added in such an amount as to give a sulfur content of the final catalyst of 0.2 to 10% by weight, particularly 0.5 to 10% by weight. The method of mixing is not particularly limited.

Kneading

In the present invention, the kneading may be conducted by the use of any conventional kneader for the preparation of catalysts. Although in general, a suitable method comprises adding water to the raw material, charging the mixture into a kneader and agitating the same with blades, the order of charging of the raw material and additives is not particularly limited. Although water is generally added in the kneading step, an organic solvent can also be added therein, and examples thereof include ethanol, isopropanol, acetone, methyl ethyl ketone and methyl isobutyl ketone. The temperature and time of kneading are not particularly limited, and may be selected respectively within such ranges as not to produce any significant effect on the properties of the raw material, i.e., the hydroxide and/or hydrated oxide of aluminum, hydroxide and/or hydrated oxide of zirconium, and sulfureous compound. Further, acids such as nitric acid, bases such as ammonia, organic compounds, binders, ceramic fibers, surfactants and/or zeolite may also be added during the kneading step, as far as the properties of the catalyst of the present invention are maintained. The catalyst of the present invention, however exhibits a sufficient strength and a high catalytic activity, even when prepared without the addition of such an additive.

Further, a compound of at least one metal element selected from among Group 8, 9 and 10 elements may be supported by adding the compound during the above kneading. In this case, the objective solid acid catalyst can be obtained by extruding the kneaded mixture and calcining the extrudate at a temperature higher than 600° C. but below 800° C. for 0.5 to 10 hours.

Shaping

The shaping to be conducted after the above kneading in the present invention may be carried out by any conventional shaping process for the preparation of catalysts. In particular, extrusion using a screw extruder or the like is favorably employed, because it permits effective shaping into arbitrary shapes including pellets and honeycombs. Although the size of the shaped material is not particularly limited, the length of the section of the shaped material is generally 0.5 mm or above. For example, cylindrical pellets 0.5 to 10 mm in diameter and 0.5 to 15 mm in length can easily be produced. Since the crushing strength of the calcined shaped material greatly depends on the conditions of the kneading, it is desirable that the amount of water, kneading time and electric energy to be employed in the above kneading are predetermined.

Since the process of the present invention does not involve the step of filtration or drying between the step of mixing and kneading a sulfureous compound and the step of shaping, it can be carried out by an easy and simple operation, thus having great industrial merits. Further, the process can give a shaped catalyst which is usable also in the fixed-bed reactions, though the powdery catalysts of the prior art could not be used therein.

Tetragonal Zirconia

The zirconia contained in the catalyst of the present invention takes a tetragonal crystal form, though it may partially contain monoclinic zirconia. The structure of the zirconia can be ascertained by X-ray diffractometry. Specifically, the area ratio of the peak at 2θ of 28.2° to that at 2θ of 30.2° is generally 1.0 or below, preferably 0.3 or below, still preferably, 0.05 or below as determined by X-ray diffractometry with copper Kα radiation. Hereinafter, the above area ratio will be abbreviated to S28.2/S30.2 (wherein S28.2 refers to the area of a peak at 2θ of 28.2° assignable to monoclinic zirconia, while S30.2 refers to the area of a peak at 2θ of 30.2° assignable to tetragonal zirconia). The presence of a smaller amount of monoclinic zirconia gives a higher catalytic activity.

Calcining Subsequent to Kneading and Shaping

The calcination according to the present invention is conducted in a gaseous atmosphere of air, nitrogen or the like at such a temperature as to give tetragonal zirconium oxide. When pseudoboehmite alumina is used, the calcining temperature is desirably 450 to 800° C., more desirably 500 to 800° C., most desirably 600 to 800° C., and the calcining time is preferably 0.5 to 10 hours. Too high a calcining temperature will enhance the content of monoclinic zirconia in the crystalline zirconium oxide to result in an S28.2/S30.2 exceeding 1, which will lead to a poor catalytic activity. On the other hand, too low a calcining temperature will fail in crystallizing zirconium oxide, which will also lead to a poor catalytic activity.

Group 8, 9 or 10 Metal Component

The Group 8, 9 or 10 metal component to be used in the present invention is preferably platinum, palladium, ruthenium, nickel or the like. The use of a compound containing such a metal is preferable to that of the metal itself. These metal compounds may be used as anhydrides or hydrates. Further, the metal compounds may be used each alone or as a mixture of two or more of them. It is preferable in the present invention that one or more of the metal compounds be used in such an amount that the sum total of the Group 8, 9 and 10 elements accounts for 0.05 to 10% by weight of the final solid acid catalyst.

Although the method for making the metal component supported on the shaped material is not particularly limited, impregnation by spraying or dipping or ion exchange is favorably employed. It is preferable in order to enhance the activity of the catalyst that the shaped material having the metal component supported thereon be calcined in a gaseous atmosphere of air, nitrogen or the like at a temperature higher than 300° C., but below 700° C., for 0.5 to 10 hours.

Incorporation of Other Components

The additional incorporation of boron and/or phosphorus can give a catalyst having an advantage in that when the catalyst is used in the isomerization of hydrocarbons, the hydrocarbons are inhibited from being decomposed by side reactions and the catalyst life is lengthened. Although the form of the boron or phosphorus component to be added is not particularly limited, the component can be supported on the shaped material in the form of boric acid, ammonium borate, trimethyl borate, phosphoric acid, ammonium dihydrogenphosphate, diammonium hydrogenphosphate, trimethyl phosphate, phosphotungstic acid, boron phosphate or the like. It is preferable that the boron compound and/or phosphorus compound be added in such an amount that the sum total of boron and phosphorus elements accounts for 0.1 to 20% by weight of the final solid acid catalyst. Alternatively, the incorporation of the boron component and/or phosphorus component may be attained also by adding the boron compound and/or the phosphorus compound during the step of kneading a hydroxide and/or hydrated oxide of aluminum, a hydroxide and/or hydrated oxide of zirconium, and a sulfureous compound.

Solid Acid Catalyst

The solid acid catalyst of the present invention can be used for various acid-catalyzed reactions such as isomerization, alkylation, acylation, esterification, etherification, acetalization, hydration, dehydration, polymerization, decomposition and nitration. In particular, it can favorably be used for the conversion of hydrocarbons, such as isomerization and acylation. The solid acid catalyst has an acid strength higher than that corresponding to the Hammett acidity function $H_0$ of −11.93 and a specific surface area of 150 m$^2$/g or above. It is preferable in order to attain a higher catalytic activity and a higher crushing strength that the specific surface area be 200 m$^2$/g or above, more preferably, 200 to 300 m$^2$/g.

It is preferable from the standpoints of catalytic activity, strength of the shaped material and so on that the sum total of zirconia and alumina account for at least 70% by weight, still preferably at least 80% by weight of the catalyst. Further, it is practically desirable that the shaped catalyst has a lateral crushing strength of 3 kg or above, particularly 5 kg or above as determined by the use of a cylindrical pellet 1.5 mm in diameter.

Isomerization of Hydrocarbons

The catalyst of the present invention is favorably used for the isomerization of hydrocarbons. In particular, it can suitably be used as a catalyst in isomerizing the linear hydrocarbons of a petroleum cut having a boiling point of about −20 to 110° C. into branched hydrocarbons in the presence of hydrogen. This isomerization is preferably carried out under the conditions of a reaction temperature of 140 to 240° C., a reaction pressure of 1 to 50 kgf/cm$^2$, an LHSV of 0.2 to 10 hr$^{-1}$, and a mole ratio of hydrogen to raw material of 0.2 to 10.

EXAMPLES

The present invention will now be described in more detail by referring to the following Examples. Prior to the Examples, the methods of evaluation will be described.

Method of Calculating the Crystal Species Ratio by X-ray Diffractometry

The separation of peaks of tetragonal and monoclinic crystals of zirconia in the X-ray diffraction chart of the catalyst was made and the area ratio of the peak at 2θ of 28.2° assignable to monoclinic zirconia to that at 2θ of 30.2° assignable to tetragonal zirconia (i.e., S28.2/S30.2 ratio) was calculated. When the S28.2/S30.2 ratio was 0.02 or below, the monoclinic zirconia peak was too ambiguous to be detected. wide-angle X-ray diffractometer: mfd. by Rigaku Corporation, RAD-1C, horizontal goniometer X-ray tube bulb: sealed Cu tube bulb (output: 30 kV–20 mA, wavelength: 1.5406 Å)

measurerment region (2θ): 3 to 90°
step width: 0.02°
scanning speed: 4°/min
slit width: divergent slit (DS): 1° scattering slit (SS): 1° receiving slit (RS): 0.3 mm
smoothing conditions: 15-point weighted smoothing method of Savitzky and Golay
region of peak separation (2θ): 26.5 to 32.5°
number of peaks to be separated: 4 (two peaks assignable to monoclinic crystal, one peak assignable to tetragonal crystal, and one peak assignable to amorphous substance)
peaks used in the calculation of crystal species ratio:
monoclinic crystal: 2θ=28.2° (d=3.163, hkl=111)
tetragonal crystal: 2θ=30.2° (d=2.960, hkl=111)

Method of Measuring Average Lateral Crushing Strength

A sample prepared by extruding each kneaded mixture into a cylinder 1.6 mm in diameter and drying and calcining the cylinder was examined for lateral crushing strength by the use of a tablet crushability tester "TH-203CP" (mfd. by Toyama & Co.,Ltd.). The measurement probe used was one having a round head 4.5 mm in diameter. This probe was applied to the center of the side of the sample to determine the lateral crushing strength. This operation was repeated twenty times and the average of the results was calculated.

Method of Measuring Specific Surface Area

Each catalyst was examined for the BET specific surface area according to the nitrogen adsorption method by the use of type ASAP2400 measuring instrument mfd. by Micrometics.

Method of Measuring Mean Particle Size

The mean particle size is determined by a wet method by the use of a MICROTRAC particle size analyzer (mfd. by Nikkiso Co., Ltd.). This method comprises irradiating a flowing powder with a laser beam and conducting the particle size analysis of the powder based on the forward scattered light.

Example 1

Preparation of Catalyst A

Commercially available zirconium oxychloride (1 kg) was dissolved in 20 liter of distilled water, and 28 wt. % aqueous ammonia was added to the obtained solution under stirring at room temperature to adjust the pH to 8. The formed precipitate of hydrated zirconia was recovered by filtration, washed with distilled water, and dried to give dry hydrated zirconia having a mean particle size of 1.2 μm. Three hundred grams of commercially available powdery hydrated alumina (pseudoboehmite) having a mean particle size of 10 μm was added to 300 g of the above dry hydrated zirconia, followed by the addition of 115 g of ammonium sulfate. The obtained mixture was kneaded in a kneader equipped with agitating blades for 2 hours, while water was added thereto. The kneaded mixture was extruded from an extruder through a circular orifice 1.6 mm in diameter, dried, and calcined at 650° C. for 3 hours to give a sulfated zirconia/alumina catalyst (catalyst A). This catalyst had a specific surface area of 240 m$^2$/g, and the total content of zirconia and alumina in the catalyst was 84.3%, with the proportion of alumina being 42.3% based on the sum total of zirconia and alumina. Further, the zirconia contained in the catalyst had a tetragonal form and no monoclinic crystals were found. Furthermore, the catalyst had a cylindrical shape having a mean diameter of 1.27 mm and a mean length of about 3 mm, and exhibited an average crushing strength of 5.1 kg.

Example 2

Preparation of Catalyst B

Commercially available powdery hydrated alumina (pseudoboehmite, 150 g) was added to 450 g of a dry hydrated zirconia powder prepared by the same process as that of Example 1, followed by the addition of 115 g of ammonium sulfate. The obtained mixture was kneaded in a kneader equipped with agitating blades for 2 hours, while water was added thereto. The kneaded mixture was extruded from an extruder through a circular orifice 1.6 mm in diameter, dried, and calcined at 650° C. for 3 hours to give a sulfated zirconia/alumina catalyst (catalyst B). This catalyst had a specific surface area of 205 m$^2$/g, and the total content of zirconia and alumina in the catalyst was 87.6%, with the proportion of alumina being 22.9% based on the sum total of zirconia and alumina. Further, the zirconia contained in the catalyst took a tetragonal form and no monoclinic crystal was found. Furthermore, the catalyst had a cylindrical shape having a mean diameter of 1.35 mm and a mean length of about 3 mm, and exhibited an average crushing strength of 3.3 kg.

Example 3
Preparation of Catalyst C

Commercially available powdery hydrated alumina (pseudoboehmite, 540 g) was added to 60 g of a dry hydrated zirconia powder prepared by the same process as that of Example 1, followed by the addition of 115 g of ammonium sulfate. The obtained mixture was kneaded in a kneader equipped with agitating blades for 2 hours, while water was added thereto. The kneaded mixture was extruded from an extruder through a circular orifice 1.6 mm in diameter, dried, and calcined at 650° C. for 3 hours to give a sulfated zirconia/alumina catalyst (catalyst C). This catalyst had a specific surface area of 280 $m^2/g$, and the total content of zirconia and alumina in the catalyst was 85.4%, with the proportion of alumina being 87.6% based on the sum total of zirconia and alumina. Further, the zirconia contained in the catalyst took a tetragonal form and no monoclinic crystals were found. Furthermore, the catalyst had a cylindrical shape having a mean diameter of 1.24 mm and a mean length of about 3 mm, and exhibited an average crushing strength of 9.5 kg.

Example 4
Preparation of Catalyst D

An aqueous solution of chloroplatinic acid was sprayed on 100 g of catalyst A prepared in Example 1 in such an amount as to give a platinum content of the catalyst of 0.5%. The resulting catalyst was dried and calcined at 500° C. for 3 hours to give a platinum-containing sulfated zirconia/alumina catalyst (catalyst D). This catalyst had a specific surface area of 230 $m^2/g$, and the zirconia contained in the catalyst had a tetragonal form and no monoclinic crystals were found. Furthermore, the catalyst had a cylindrical shape having a mean diameter of 1.27 mm and a mean length of about 3 mm, and exhibited an average crushing strength of 4.5 kg.

Example 5
Preparation of Catalyst E

An aqueous solution of chloroplatinic acid was sprayed on 100 g of catalyst B prepared in Example 2 in such an amount as to give a platinum content of the catalyst of 0.5%. The resulting catalyst was dried and calcined at 500° C. for 3 hours to give a platinum-containing sulfated zirconia/alumina catalyst (catalyst E). This catalyst had a specific surface area of 200 $m^2/g$, and the zirconia contained in the catalyst had a tetragonal form and no monoclinic crystals were found. Furthermore, the catalyst had a cylindrical shape with a mean diameter of 1.35 mm and a mean length of about 3 mm, and exhibited an average crushing strength of 3.1 kg.

Example 6
Preparation of Catalyst F

Commercially available powdery hydrated alumina (pseudoboehmite, 300 g) was added to 300 g of a dry hydrated zirconia powder prepared by the same process as that of Example 1, followed by the addition of 120 g of ammonium sulfate and 117 g of boric acid. The obtained mixture was kneaded in a kneader equipped with agitating blades for 2 hours, while water was added thereto. The kneaded mixture was extruded from an extruder through a circular orifice 1.6 mm in diameter, dried, and calcined at 700° C. for one hour to give a sulfated zirconia/alumina/boria catalyst. An aqueous solution of chloroplatinic acid was sprayed on 100 g of this catalyst in such an amount as to give a platinum content of the catalyst of 0.5%. The resulting catalyst was dried and calcined at 540° C. for one hour to give a platinum-containing sulfated zirconia/alumina/boria catalyst (catalyst F). The boron content of this catalyst was 3.3%, with the proportion of alumina being 43.0% based on the sum total of zirconia and alumina. Further, the zirconia contained in the catalyst had a tetragonal form and no monoclinic crystal were found. Furthermore, the catalyst had a cylindrical shape, and exhibited an average crushing strength of 5.4 kg.

Example 7
Preparation of Catalyst G

Three hundred grams of powdery hydrated alumina (pseudoboehmtite) was added to 300 g of a dry hydrated zirconia powder having a mean particle size of 1.2 $\mu$m and prepared by drying ziconium hydroxide "XZO631/01" (a product of MEL), followed by the addition of 115 g of ammonium sulfate. The obtained mixture was kneaded in a kneader equipped with agitating blades for 2 hours, while water was added thereto. The kneaded mixture was extruded from an extruder through a circular orifice 1.6 mm in diameter, dried, and calcined at 650° C. for 2 hours to give a sulfated zirconia/alumina catalyst. An aqueous solution of chloroplatinic acid was sprayed on 100 g of this catalyst in such an amount as to give a platinum content of the catalyst of 0.5%. The resulting catalyst was dried and calcined at 550° C. for 2 hours to give a platinum-containing sulfated zirconia/alumina catalyst (catalyst G).

Example 8
Preparation of Catalyst H

Three hundred grams of powdery hydrated alumina (pseudoboehmite) was added to 300 g of a dry hydrated zirconia powder prepared by the same process as that of Example 7, followed by the addition of 50 g of ammonium sulfate. The obtained mixture was kneaded in a kneader equipped with agitating blades for 2 hours, while water was added thereto. The kneaded mixture was extruded from an extruder through a circular orifice 1.6 mm in diameter, dried, and calcined at 650° C. for 2 hours to give a sulfated zirconia/alumina catalyst. An aqueous solution of chloroplatinic acid was sprayed on 100 g of this catalyst in such an amount as to give a platinum content of the catalyst of 0.5%. The resulting catalyst was dried and calcined at 550° C. for 2 hours to give a platinum-containing sulfated zirconia/alumina catalyst (catalyst H).

Example 9
Preparation of Catalyst I

One hundred and twenty grams of powdery hydrated alumina (pseudoboehmite) was added to 480 g of a dry hydrated zirconia powder prepared by the same process as that of Example 7, followed by the addition of 115 g of ammonium sulfate. The obtained mixture was kneaded in a kneader equipped with agitating blades for 2 hours, while water was added thereto. The kneaded mixture was extruded from an extruder through a circular orifice 1.6 mm in diameter, dried, and calcined at 650° C. for 2 hours to give a sulfated zirconia/alumina catalyst. An aqueous solution of chloroplatinic acid was sprayed on 100 g of this catalyst in such an amount as to give a platinum content of the catalyst of 0.5%. The resulting catalyst was dried and calcined at 550° C. for 2 hours to give a platinum-containing sulfated zirconia/alumina catalyst (catalyst I).

Comparative Example 1
Preparation of Catalyst J

Ten liters of a 0.5 mol/l aqueous solution of sulfuric acid was added to 1 kg of a dry hydrated zirconia powder prepared by the same process as that of Example 1 to bring them into contact with each other. The obtained mixture was freed from excessive sulfuric acid by filtration, dried, and calcined at 600° C. for 3 hours to give a sulfated zirconia catalyst (catalyst J). This catalyst had a specific surface area of 110 m²/g. The zirconia contained in the catalyst had a tetragonal form with a slight amount of monoclinic crystals. The S28.2/S30.2 was 0.07.

Comparative Example 2
Preparation of Catalyst K

Ammonium sulfate (115 g) was added to 600 g of commercially available powdery hydrated alumina (pseudoboehmite). The obtained mixture was kneaded in a kneader equipped with agitating blades for 2 hours, while water was added thereto. The obtained kneaded mixture was extruded from an extruder through an orifice 1.6 mm in diameter, dried, and calcined at 650° C. for 3 hours to give a sulfated alumina catalyst (catalyst K). This catalyst had a specific surface area of 290 m²/g, and a cylindrical shape having a mean diameter of 1.24 mm and a mean length of about 3 mm. The average lateral crushing strength was 10.7 kg.

Comparative Example 3
Preparation of Catalyst L

A catalyst (catalyst L) was prepared by pulverizing and mixing both catalyst J (Comparative Example 1) and catalyst K (Comparative Example 2)in such amounts as to give an alumina to (zirconia+alumina) ratio of 42.3%.

Comparative Example 4
Preparation of Catalyst M

A catalyst (catalyst M) was prepared by pulverizing and mixing both catalyst J (Comparative Example 1) and catalyst K (Comparative Example 2) in such amounts as to give an alumina to (zirconia+alumina) ratio of 22.9%.

Comparative Example 5
Preparation of Catalyst N

A catalyst (catalyst N) was prepared by pulverizing and mixing both catalyst J (Comparative Example 1) and catalyst K (Comparative Example 2) in such amounts as to give an alumina to (zirconia+alumina) ratio of 87.6%.

Comparative Example 6
Preparation of Catalyst O

Ten liters of a 0.5 mol/liter aqueous solution of sulfuric acid was added to 1 kg of a dry hydrated zirconia powder prepared by the same process as that of Example 1 to bring them into contact with each other. The obtained mixture was freed from excessive sulfuric acid by filtration, dried, and calcined at 650° C. for 3 hours to give a sulfated zirconia catalyst. An aqueous solution of chloroplatinic acid was sprayed on 100 g of this catalyst in such an amount as to give a platinum content of the catalyst of 0.5%. The resulting catalyst was dried and calcined at 500° C. for 3 hours to give a platinum-containing sulfated zirconia catalyst (catalyst O). This catalyst had a specific surface area of 100 m²/g. The zirconia contained in the catalyst had a tetragonal form with a slight amount of monoclinic crystals. The S28.2/S30.2 was 0.07.

Comparative Example 7
Preparation of Catalyst P

An aqueous solution of chloroplatinic acid was sprayed on 100 g of catalyst K (Comparative Example 2) in such an amount as to give a platinum content of the catalyst of 0.5%. The resulting catalyst was dried and calcined at 500° C. for 3 hours to give a platinum-containing sulfated alumina catalyst (catalyst P). This catalyst had a specific surface area of 275 m²/g, and a cylindrical shape having a mean diameter of 1.24 mm. The average lateral crushing strength was 9.5 kg.

Comparative Example 8
Preparation of Catalyst Q

An aqueous solution (125 ml) of chloroplatinic acid containing 0.25 g of platinum was added to 50 g of a dry hydrated zirconia powder prepared by the same process as that of Example 7. The obtained mixture was dried, followed by the addition of 125 ml of a 0.5 mol/liter aqueous solution of sulfuric acid. The mixture thus obtained was dried and calcined at 650° C. for 2 hours to give a platinum-containing sulfated zirconia catalyst (Catalyst Q).

Acylation Example

The catalysts prepared in the Examples and Comparative Examples were each evaluated for activity by applying them to batchwise acylation of a small volume. In order to enhance the agitation efficiency, granular catalysts were each pulverized in a mortar and screened prior to their use and the obtained particles smaller than 32 mesh were used. Two grams of each catalyst, 22.5 g of chlorobenzene and 3.5 g of p-chlorobenzoyl chloride were put in a 50-ml flask equipped with a condenser and a stirrer, and heated to 135° C. on an oil bath to conduct a reaction. After 3 hours, the reaction mixture was analyzed by gas chromatography. The yields of dichlorobenzophenone (i.e., acylate) are given below. Further, FIG. 1 shows the relationship between the aluminum to (zirconia+alumina) ratio and yield of the acylate.

| Catalyst | Yield of acylate (%) |
|---|---|
| A (Ex.) | 25 |
| B (Ex.) | 27 |
| C (Ex.) | 13 |
| J (Comp. Ex.) | 22 |
| K (Comp. Ex.) | 7 |
| L (Comp. Ex.) | 16 |
| M (Comp. Ex.) | 19 |
| N (Comp. Ex.) | 9 |

It can be understood that the catalysts of the present invention are remarkably improved in activity by virtue of the combination of zirconia with alumina, while the catalysts prepared by pulverizing the sulfated solid acid catalyst (catalyst J) and the sulfated solid acid catalyst (catalyst K) and mixing the pulverized catalysts with each other exhibit only an effect due to the dilution with alumina. In a large-volume reaction, particularly one conducted by the use of a flow reactor, it is preferable to use a catalyst having a size of 0.5 mm or above.

Isomerization Example (1)

The isomerization of n-hexane was conducted in a fixed-bed flow reactor having a length of 50 cm and an inner diameter of 1 cm and filled with 4 cc of a shaped granular platinum-containing catalyst having a size of 16 to 24 mesh.

The conditions of the isomerization are as follows:

reaction temp: 200° C.

reaction pressure (gauge): 10 kgf/cm²

LHSV: 1.5 hr$^{-1}$

H₂/Oil: 5 (mole/mole)

The reaction mixture discharged from the reactor after 1.5 hours from the initiation of flowing of oil was analyzed by gas chromatography, and the results are as follows:

| Conversion of n-hexane | |
|---|---|
| catalyst D (Ex.) | 85% |
| catalyst G (Ex.) | 86% |
| catalyst H (Ex.) | 84% |
| catalyst I (Ex.) | 87% |
| catalyst P (Comp. Ex.) | 76% | conversion of n-hexane = {1−[n-hexane content (% by mass) of product oil/that of starting oil]} × 100 (%)

By virtue of the combination of zirconia with alumina, the catalysts of the present invention surprisingly exhibit a high activity corresponding to a conversion of n-hexane of 80% or above in the isomerization under the above-mentioned conditions, which is beyond the activity of catalyst Q, i.e., a platinum-containing sulfated zirconia powdery catalyst.

Isomerization Example (2)

The isomerization of a paraffin mixture (comprising 70% by weight of n-hexane, 15% by weight of n-heptane, and 15% by weight of cyclohexane) was conducted in a fixed-bed flow reactor having a length of 50 cm and an inner diameter of 1 cm and filled with 4 cc of a shaped granular platinum-containing catalyst having a size of 16 to 24 mesh.

The conditions of the isomerization are as follows:

reaction temp: 220° C.

reaction pressure (gauge): 4.8 kgf/cm²

LHSV: 5.0 hr⁻¹

H₂/Oil: 5 (mole/mole)

The reaction mixture discharged from the reactor after 1.5 hours from the initiation of flowing of oil was analyzed by gas chromatography, and the results are as follows:

| Conversion of n-hexane | |
|---|---|
| catalyst D (Ex.) | 54% |
| catalyst F (Ex.) | 55% | conversion of n-hexane = {1−[n-hexane content (% by mass) of product oil/that of starting oil]} × 100 (%)

Industrial Applicability

The shaped solid acid catalyst of the present invention exhibits not only a high catalytic activity for various acid-catalyzed reactions but also a high mechanical strength. Further, the catalyst has the advantages of being easily separable from the reaction mixture and reusable. Furthermore, the catalyst can be prepared by the kneading method which is easy of in industrial application, thus being industrially valuable also in this respect.

What is claimed is:

1. A process for the preparation of a shaped solid acid catalyst which comprises:
    (a) kneading a hydroxide and/or hydrated oxide of aluminum, a hydroxide and/or hydrated oxide of zirconium, and a sulfureous compound,
    (b) shaping the kneaded mixture, and
    (c) calcining the obtained shaped material at such a temperature as to give tetragonal zirconia, wherein the weight percentage of the alumina and/or hydrous alumina to the sum total of the zirconia and/or hydrous zirconia and the alumina and/or hydrous alumina is 5 to 50% by weight, the weights of the zirconia and/or hydrous zirconia and the alumina and/or hydrous alumina being expressed in terms of the weights of zirconia and alumina, respectively, in the solid catalyst.

2. A process for the preparation of a shaped solid acid catalyst according to claim 1, wherein aluminum oxide hydrate having a boehmite structure is used as the hydroxide and/or hydrated oxide of aluminum.

3. A process for the preparation of a shaped solid acid catalyst according to claim 1, wherein the hydroxide and/or hydrated oxide of zirconium is amorphous.

4. A process for the preparation of a shaped solid acid catalyst according to claim 1, wherein an area ratio of a peak at 2θ of 28.2° assignable to monoclinic zirconia to that at 2θ of 30.2° assignable to tetragonal zirconia determined by 1.5406 Å X-ray diffractometry for the catalyst is 0.3 or below.

5. A process for the preparation of a shaped solid acid catalyst, which comprises:
    (a) kneading a hydroxide and/or hydrated oxide of aluminum, a hydroxide and/or hydrated oxide of zirconium, and a sulfureous component,
    (b) shaping the kneaded mixture,
    (c) calcining the obtained shaped material at such a temperature as to give tetragonal zirconia, and
    (d) supporting a Group 8, 9 or 10 metal component on the calcined material, wherein the weight percentage of the alumina and/or hydrous alumina to the sum total of the zirconia and/or hydrous zirconia and the alumina and/or hydrous alumina is 5 to 50% by weight and the weights of the zirconia and/or hydrous zirconia and the aluminum and/or hydrous alumina are expressed in terms of the weights of zirconia and alumina, respectively, in the solid catalyst.

6. A process for the preparation of a shaped solid acid catalyst according to claim 5, wherein aluminum oxide hydrate having a boehmite structure is used as the hydroxide and/or hydrated oxide of aluminum.

7. A process for the preparation of a shaped solid acid catalyst according to claim 5, wherein the hydroxide and/or hydrated oxide of zirconium is amorphous.

8. A process for the preparation of a shaped solid acid catalyst according to claim 5, wherein an area ratio of a peak at 2θ of 28.2° assignable to monoclinic zirconia to that at 2θ of 30.2° assignable to tetragonal zirconia determined by 1.5406 Å X-ray diffractometry for the catalyst is 0.3 or below.

9. A process for the preparation of a shaped solid acid catalyst according to claim 5, wherein the Group 8, 9 or 10 metal component is platinum.

10. A shaped solid acid catalyst for the isomerization of hydrocarbons, which comprises:
    (a) a shaped support comprising portions of tetragonal zirconia and/or hydrous zirconia and portions of alumina and/or hydrous alumina and
    (b) a sulfureous component and a Group 8, 9 or 10 metal component supported on the support, wherein the weight percentage of the alumina and/or hydrous alumina to the sum total of the zirconia and/or hydrous zirconia and the alumina and/or hydrous alumina is 5 to 50% by weight and the weights of the zirconia and/or hydrous zirconia and the alumina and/or hydrous alumina are expressed in terms of the weights of zirconia and alumina, respectively, in the solid catalyst.

11. A shaped solid acid catalyst according to claim 10, wherein said metal component is platinum.

12. A shaped solid acid catalyst according to claim 10, wherein an area ratio of a peak at 2θ of 28.2° assignable to monoclinic zirconia to that at 2θ of 30.2° assignable to tetragonal zirconia determined by 1.5406 Å X-ray diffractometry for the catalyst is 0.3 or below.

13. A shaped solid acid catalyst according to claim 10, wherein said catalyst has a specific surface area of 150 m$^2$/g or above.

14. A shaped solid acid catalyst according to claim 10, wherein said isomerization is conducted in the presence of hydrogen.

15. A shaped solid acid catalyst according to claim 14, wherein a mole ratio of hydrogen to raw material is 0.2 to 10.

16. A shaped solid acid catalyst according to claim 10, wherein the portions of alumina and/or hydrous alumina are made from aluminum oxide hydrate having a boehmite structure.

* * * * *